United States Patent
Bargauan

(10) Patent No.: US 7,843,969 B2
(45) Date of Patent: Nov. 30, 2010

(54) COMMUNICATIONS SYSTEM TO FEED MULTIPLE SINGLE FREQUENCY NETWORKS WITH MULTIPLE CONTENT

(75) Inventor: Michele Bargauan, Novate Milanese (IT)

(73) Assignee: Screen Service Broadcasting Technologies S.p.A., Brescia (IT)

( * ) Notice: Subject to any disclaimer, the term of this patent is extended or adjusted under 35 U.S.C. 154(b) by 67 days.

(21) Appl. No.: 12/139,846

(22) Filed: Jun. 16, 2008

(65) Prior Publication Data
US 2008/0310453 A1 Dec. 18, 2008

Related U.S. Application Data

(60) Provisional application No. 60/929,182, filed on Jun. 15, 2007.

(51) Int. Cl.
H04H 20/28 (2008.01)
(52) U.S. Cl. .............. 370/486; 370/350; 370/503; 725/35; 725/144
(58) Field of Classification Search .......... 370/350, 370/508
See application file for complete search history.

(56) References Cited

U.S. PATENT DOCUMENTS

2005/0190872 A1 9/2005 Seong et al.
2006/0088023 A1* 4/2006 Muller .................. 370/350
2007/0074267 A1* 3/2007 Clerget et al. ............ 725/136
2007/0286245 A1 12/2007 Yamada

FOREIGN PATENT DOCUMENTS

| EP | 1 083 688 | 3/2001 |
| EP | 1 175 008 | 1/2002 |
| EP | 1 503 592 | 2/2005 |
| EP | 1 768 285 | 3/2007 |
| WO | WO 2006/084361 | 8/2006 |

OTHER PUBLICATIONS

"Digital Video Braodcasting (DVB); DVB mega-frame for Single Frequency Network (SFN) synchronication; ETSI TS 101 191" ETSI Standards, LIS, Sophia Antipolis Cedex, France, vol. BC, No. V1.4.1, Jun. 2004.
"Digital Video Braodcasting (DVB); Framing structure channel coding and modulation for digital terrestrial television" ETSI EN 300 744, V1.4.1, Jan. 2001.
"Digital Video Broadcasting (DVB); Implementation Guidelines for DVB terrestrial services; Transmission aspects" TR 101 190, V1.1.1, Dec. 1997, pp. 1-77.

* cited by examiner

*Primary Examiner*—Huy D Vu
*Assistant Examiner*—Maria Sekul
(74) *Attorney, Agent, or Firm*—Andrew Bodendorf

(57) ABSTRACT

A system and processes create a transport stream carrying several encapsulated contents, watermarks, and other ancillary data. The transport stream is re-multiplexed while keeping synchronous and deterministic operation. Synchronous deterministic operation allow each derived transport stream to be broadcasted in Single Frequency Networks, as all re-multiplexers have the same signal at the input and selecting the same content generates exactly the same stream in multiple locations.

20 Claims, 3 Drawing Sheets

COMMUNICATIONS SYSTEM TO FEED MULTIPLE SINGLE FREQUENCY NETWORKS WITH MULTIPLE CONTENT

CROSS-REFERENCE TO RELATED APPLICATIONS

This application claims the benefit under 35 U.S.C. §119(e) of U.S. Provisional Application No. 60/929,182 titled "System for multiplexing Content into a Single Transport Stream for re-multiplexing to Feed Multiple Single Frequency Networks with Different Content" filed on Jun. 15, 2007 in the U.S. Patent and Trademark Office, the entire disclosure of which is herein incorporated by reference in its entirety for all purposes.

TECHNICAL FIELD

The following description relates generally to a system useful to broadcaster and mobile multimedia operators in delivering transport streams sharing content to several points, and in particular to single frequency networks.

BACKGROUND

A single frequency network (SFN) is a powerful way to achieve large coverage areas in many digital broadcasting schemes, such as, for example, Digital Video Broadcasting for Terrestrial (DVB-T), Digital Video Broadcasting for Handheld Mobile Television (DVB-H), and Advanced Television Systems Committee (ATSC) broadcasting as SFNs allow transmitters to extend their area of coverage without using a second channel. This is important because portions of an available broadcast spectrum are one of the most expensive commodities in broadcast networks.

Signals feeding all transmitters in SFN systems must be totally synchronous (i.e., the signal must contain the very same bit stream and reach the transmitter within fixed time tolerances). In large systems, different areas are covered by SFN transmitters that have partially different content (e.g., insertion of regional content). As a result, different bit streams are required at different SFN areas. A traditional telecom approach to support such a system is to transport elementary signals to SFN nodal points, multiplex signals to create different streams for each SFN, and provide dedicated feeds to SFN transmitters. However, such an arrangement is very expensive and fragile when large areas (e.g., countries or continents) are covered with thousands of transmitters. Other approaches use satellite feeds to deliver signals by multiplexing all SFN signals together. Unfortunately, broadcasting all streams in parallel when many variants are required is also expensive since bandwidth increases linearly with the number of SFN areas. Therefore, improved broadcasting schemes are needed for multiple transmitters servicing a large SFN.

SUMMARY

In one general aspect, a method of supplying multiple content sources in a single transport stream for broadcast in a single frequency network is described below. The method includes receiving multiple transport streams with differing content, processing the input transport streams to determine information about packets of the transport stream, selecting packets from the multiple transport streams, slicing the selected packets into a block of packets, composing a metric feed packet (MFP), inserting the MFP before or after the block of packets, and output the block of packets and MFP in a transport stream of a single frequency network.

Processing the input stream may include identifying elements of the stream, packet type, and content type.

Composing the MFP may include determining the destination of the selected packets. Composing the MFP also may include providing timing information for synchronous re-multiplexing of the input at a destination. Composing the MFP also may include providing a map of each packet of the frame to a predetermined channel to de-multiplex the block of packets. Composing the MFP also may include providing clock recovery parameters including the bit-rate setting of the block of packets. Composing the MFP also may include providing a packet identifier remapping table for the block of packets. Composing the MFP also may include providing a packet identifier filtering table for the block of packets. Composing the MFP also may include providing a time slice start of the block of packets.

The method may further include deriving an output time signal from an external reference to provide timing for the output transport stream.

In yet another aspect, a multiplexer for supplying a single transport stream including multiple content sources for broadcast in a single frequency network is described below. The multiplexer includes a plurality of inputs for receiving multiple transport streams with differing content; an analyzer to process the input transport streams to determine information about packets of the transport stream; a controller to generate control signals based on the determined information; a selector to select packets from the multiple transport streams based on the control signal; a buffer slicing the selected packets into a block of packets; a metric feed packet (MFP) composer to generate an MFP based on one the control signal; an interleaver to insert the MFP before or after the block of packets; and an output to transmit the block of packets and MFP in a transport stream of the single frequency network.

The analyzer may identify elements of the stream, packet type, and content type.

The MFP composer may determine the destination of the selected packets.

The MFP may include timing information for synchronous re-multiplexing of the input at a destination.

The system may include an output timer to output a timing signal from an external reference to provide timing for the output transport stream.

The MFP may include a map of each packet of the frame to a predetermined channel to de-multiplex the block of packets, clock recovery parameters including the bit-rate setting of the block of packets, a packet identifier remapping table for the block of packets, a packet identifier filtering table for the block of packets, or an indication of a time slice start of the block of packets.

Other features will be apparent from the detailed description, drawings, and claims.

BRIEF DESCRIPTION OF THE DRAWINGS

Throughout the drawings and the detailed description, like reference numerals refer to the like elements.

DETAILED DESCRIPTION

In SFN systems, signals feeding all transmitters must be totally synchronous (i.e., the signal must contain the very same bit stream and reach the transmitter within fixed time tolerances). The processes and systems described in further detail below provide multiplexing and re-multiplexing of information to feed multiple SFN areas using a single feed and selecting location by location which information are required (with minimum overhead and without any coordination between locations).

Figure 1:
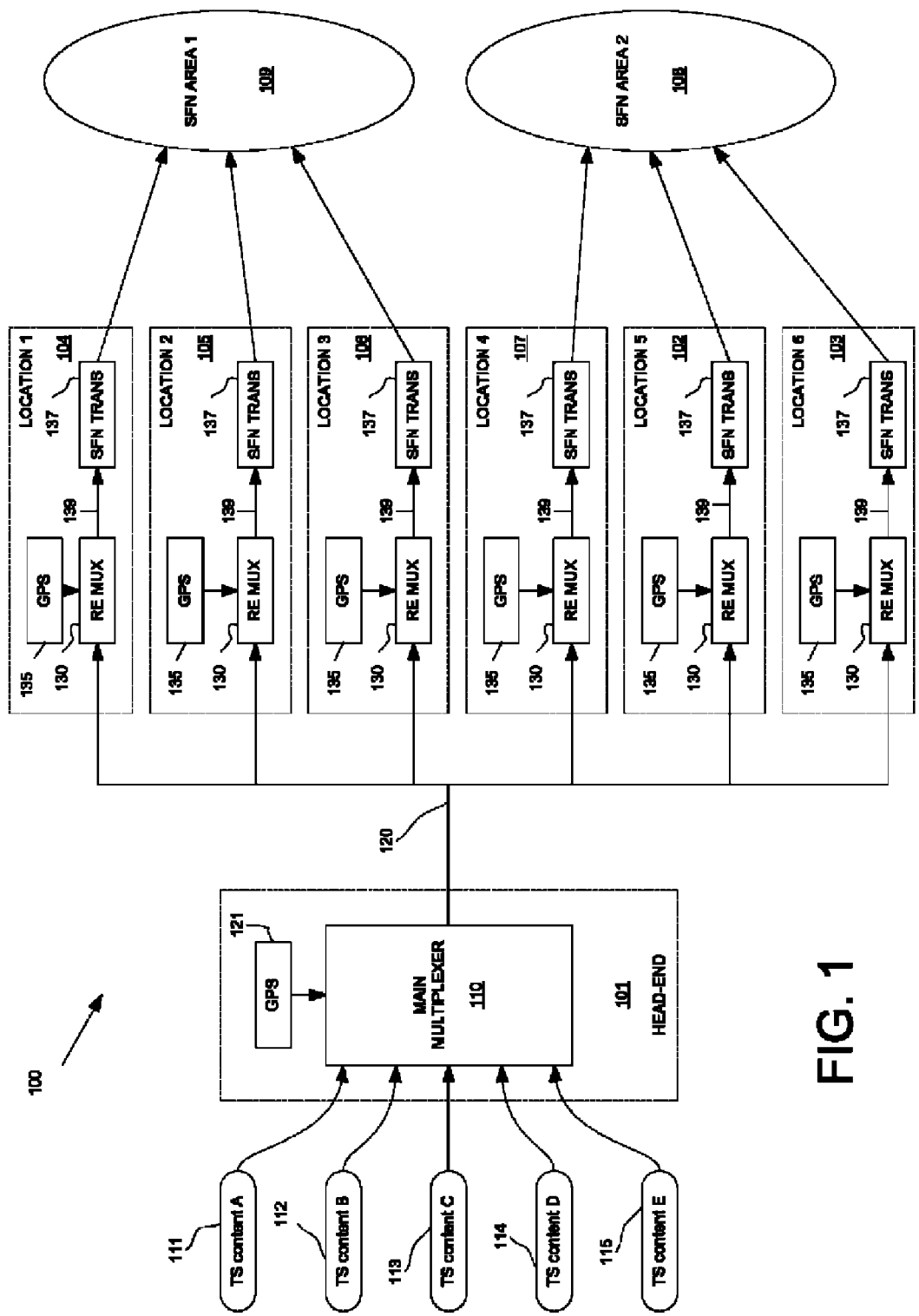
FIG. 1 is an exemplary block diagram of a system for single frequency networks.

FIG. 1 shows one example 100 of a SFN (e.g., as defined by ETS 101 191 and in ATSC A110 standards). The network includes a head end 101, different locations 102, 103, 104, 105, 106, 107 and a SFN serviced areas 108 and 109. As shown in FIG. 1, a main multiplexer 110 located at the head end 101 of the SFN network receives multiple transport streams (e.g., as defined by ISO 138181-1) 111, 112, 113, 114, 115. Each of the transport streams may include different content (e.g., A, B, C, D, and E) provided from different content providers. The main multiplexer 110 multiplexers the content supplied by the multiple streams together to form a single transport stream 120. Time stamps locked to a stable reference 121 may be implemented using a Global Positioning System (GPS) receiver (e.g., part of NAVISTAR GPS managed by US Department of Defense) may be inserted in the stream. In addition, watermarks and other ancillary data also may be inserted.

The complete transport stream 120 is sent to different locations (e.g., location 102, location 103, location 104, location 105, location 106, and location 107). Each location includes a re-multiplexer 130, a stable reference 135, and transmitter 137 to broadcast signals to an SFN area 108 or 109. In FIG. 1, the three locations are shown as an example only to illustrate the teaching herein. Any number of locations may be supported by the teachings herein.

At each location, a re-multiplexer 135 receives the transport stream 120. Each re-multiplexer is synchronized with a stable reference source 135 (e.g., GPS receiver) to generate an identical transport stream 139 to drive a corresponding transmitter 137. The transmitters 137 broadcast signals to the area SFN 108 or 109.

Figure 2:
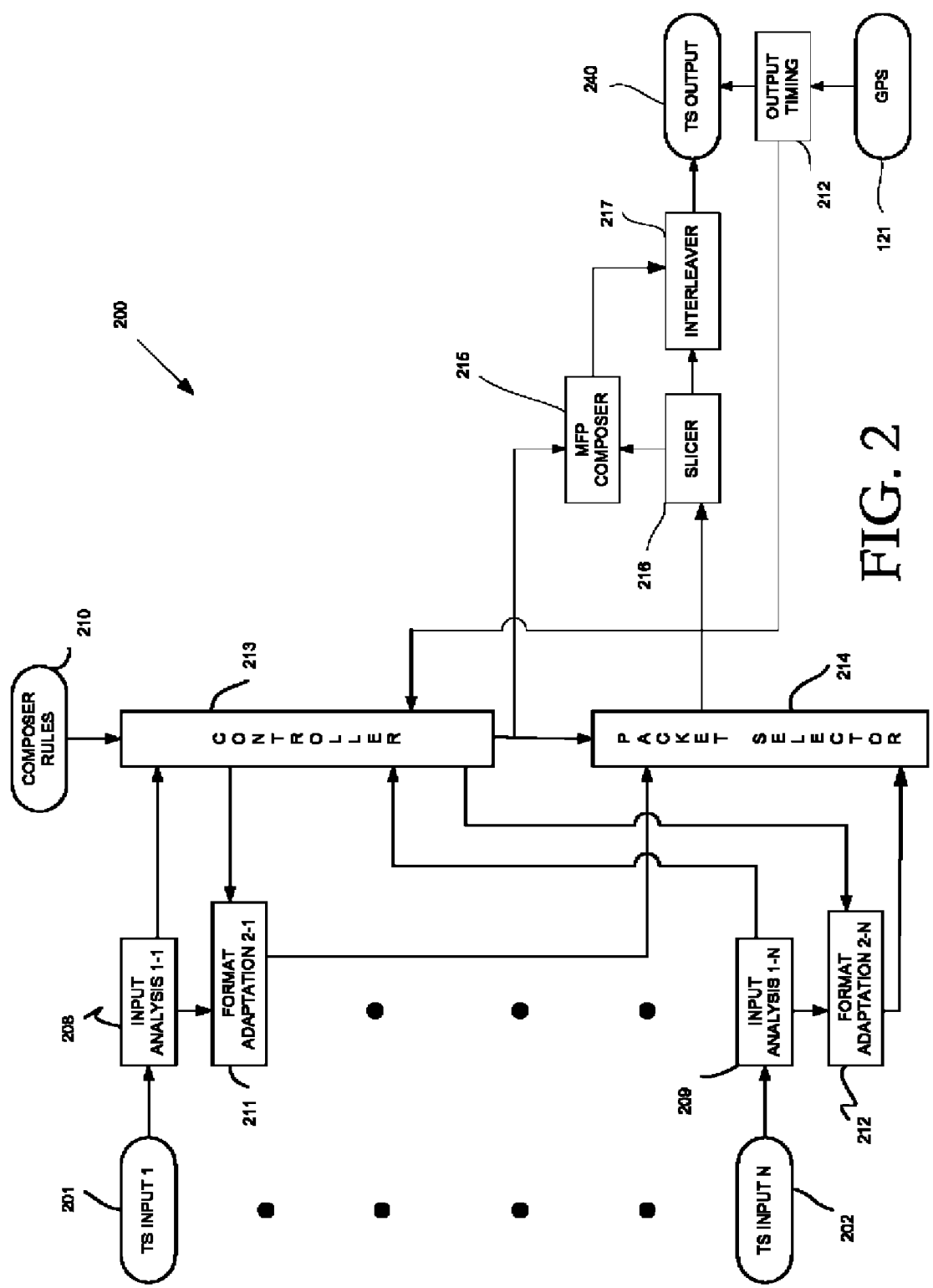
FIG. 2 is an exemplary block diagram of the main multiplexer for use the in the system of FIG. 1.

FIG. 2 illustrates one example 200 of an implementation for the main multiplexer 110 having multiple TS input streams 201 and 202. The multiplexer 200 includes N inputs for N TS input streams. For clarity of illustration, only TS input stream 1 input 201, and TS input stream N 202 are shown, with potential inputs 2 to N-1 illustrated by dots, as an arbitrary number of inputs may be applied. Analyzers 208 and 209 perform an analysis of input transport streams and identify the stream content. For example, the analysis identifies elements of the stream, such as video and system information, determines packet type, content type, among other information used to process the stream. Analyzers 208 and 209 pass the analysis results and packet-by-packet packet type identification to controller 213. Adaptors 211 and 212 process the input transport stream packets from Analyzers 208 and 209, respectively, for format adaptation according to a instructions provided by the controller 213. It will be appreciated that such format adaptation is optional and may be provided for optimized packet transmission. The controller 213 gathers information on the transport stream structure, information about the actual packets in the stream, controls the type processing performed on each incoming packet by the format adaptation of adaptors 211 and 212, provides instructions to the packet selector 214, and provides information to the Metric Feed Packet (MFP) composer 215 about the destination of the selected packets based on the composer rules 210, as described in further detail below. MFPs are transport stream packets conforming to a MFP protocol illustrated herein to supply there-multiplexer with information needed for synchronous re-multiplexing.

Packet slicer 216 slices the output of the packet selector 214 into TS blocks whose lengths are dependent on the protocol selected, as described below, and provides a count to the MFP composer 215. Interleaver 217 inserts one MFP packet created by MFP composer 215 before or after every TS block of packets delivered from the slicer 216. Output timing 218 may be derived from an external reference 121, for example, a GPS receiver, for all timing for the output stream 240 and for the controller 213.

Figure 3:
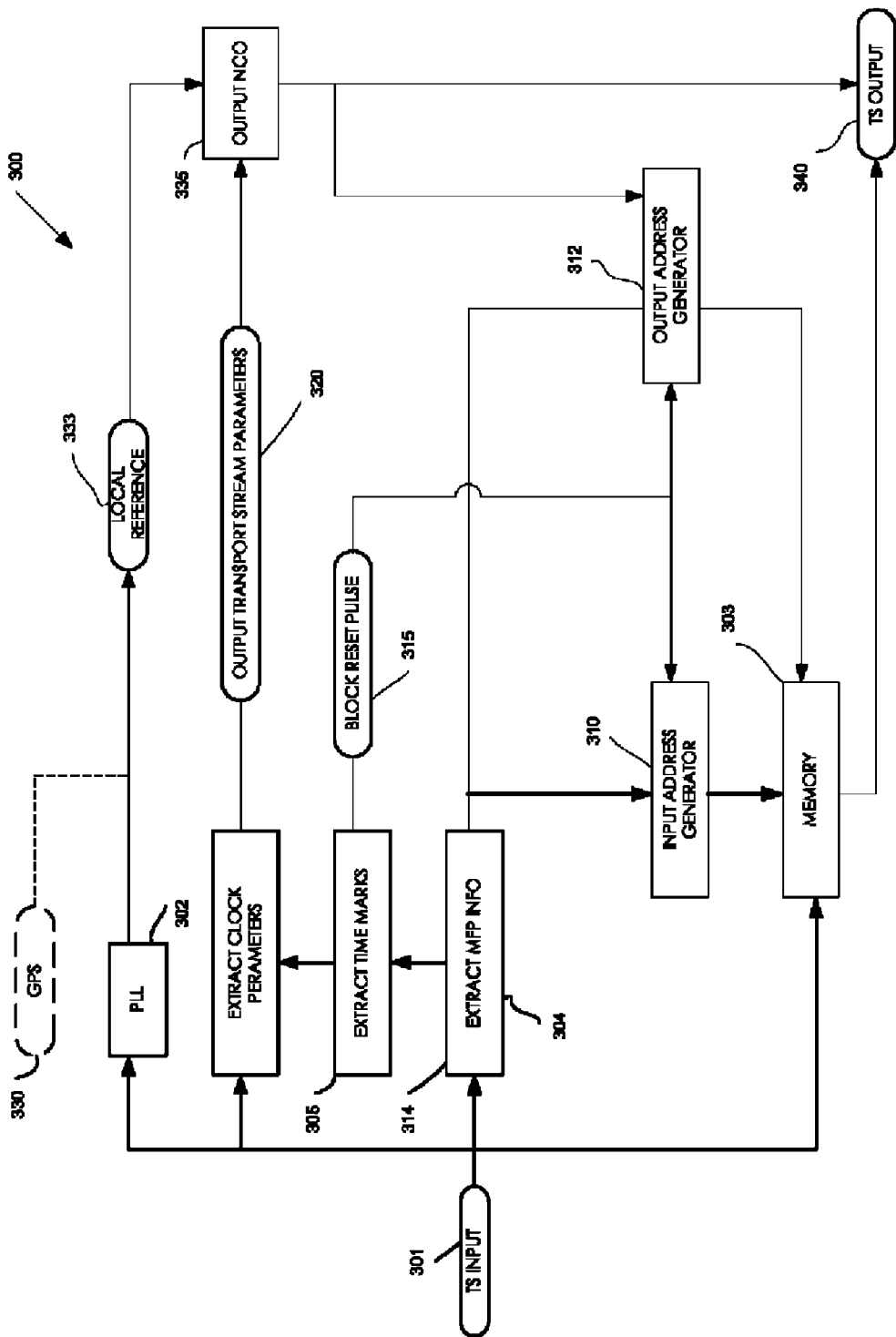
FIG. 3 is an exemplary block diagram of the re-multiplexer for use the in the system of FIG. 1.

FIG. 3 illustrates on example 300 of a block diagram of a re-multiplexer 130. The re-multiplexer 300 receives the TS input stream 301. The TS input signal is provided to the phase locked loop (PPL) 302, memory 303, and detectors 304 and 305. Detector 304 detects the MFP packets present in the input stream 301 and passes the content of the MFP packets to the input address generator 310 and the output address generator 312. The input address generator computes an address for the buffer in of memory 303 for operations related to incoming packets. Extractor 314 detects MFP packets carrying a time-slice start extracting the time marks generating a reset pulse 315 for the input address generator 310 and the output address generator 312. Detector 305 detects MFP packets carrying a clock recovery parameters function or Mega-frame Initialization Packet packets (MIPs) and computes output transport stream clock parameters 320.

The re-multiplexer 300 uses a reference 325 obtained, for example, via a PLL 302 locked to the input transport stream 301. Alternatively, an external reference, such as a GPS receiver 330 may be used to derive the local reference 325. The local reference 325 is provided to the Numeric Controlled Oscillator (NCO) 337. It may be noted that such reference is already forecasted by ETS 101 191 as necessary for SFN operation and also is used by the transmitter for center frequency coordination. The NCO 337 generates an output bit rate from local reference 325 based on output TS clock parameters. The output address generator 312 generates read addresses for output related operations for memory 303. The addresses are computed using timing pulses from the NCO 337, the reset pulses 315 from the detector 314, and from information contained in incoming MFP packets delivered by detector 304. Using the computed address, packets are read from memory 303 and re-multiplexed at output 340. Note that further processing may be necessary for some applications. For example, a Packet Identifier (PID) (i.e., a unique integer value used to associate elementary streams of a program in a single or multi-program transport stream, for example, as defined by ISO/IEC 13818-1) remapping may be provided, or Program Clock Reference (PCR) (i.e., a time stamp in the transport stream from which decoder timing is derived, for example, as defined by ISO/IEC 13818-1) re-timing may be supported. These processes are already known in standard equipment for transport streams and therefore are not described in further detail here.

As described above, the system 100 has three main elements: the main multiplexer 110, the metric feed packet (MFP) protocol, and the re-multiplexer 130. The system slices transport streams into blocks of TS packets and adds before/after each block at least one extra packet with information regarding the destination of the packet. The system inserts time stamps delimiting processing time frames suitable to reset re-multiplexing engines and change and reverse change time positions of different elements within the time frame previously defined. The transport streams (e.g. 201, 202) from different sources are analyzed in order to extract some basic timing and structural elements. For example, the analyzers 208 and 209:

- extract PID for each input packet;
- Identify Table ID (e.g., the 8-bit field which identifies system information, program specific information, or a private table) according to the tree structure defined in ISO 13818-1 and ETS 300 486 like the Program Association Table (PAT), for example, as defined by ISO/IEC 13818-1, the Program Map Table (PMT) which identifies and indicates the location of the streams that make up each service, and location of the Program Clock Reference fields for a service, for example, as defined by ISO/IEC 13818-1, and the Service Description Table (SDT) which contains data describing the services in the system, for example, as defined by ETSI EN 300 468;
- identify PID referenced by the PMT, the Network Information Table (NIT) which provides information about the physical organization of networks, for example, as defined by ETSI EN 300 468, and the unreferenced PID;
- identify MIP (e.g., as described by ETSI TS 101 191) and related fields for SFN;
- identify Multi Protocol Encapsulation (MPE), such as described by ETSI EN 301 192 table type 0x3E and related fields conforming to ETS 101 192; and
- compute the average burst time and Time Slice Period (i.e., the repetition time of bursts, such as the number of 10 ms units between the start of two consecutive bursts, for example, as defined by ETSI EN 301 192) for the MPE (table type 0x3E) and Multi Protocol Encapsulation—Forward Error Correction (MPE-FEC) for example, as described by ETSI EN 301 192 (table type 0x78) packets.

The analysis is passed to the controller 213 which implements decisions contained in composer rules. The composer rules may establish which elements are placed in the transport streams that the re-multiplexer 130 extracts from the transport stream output from the main multiplexer.

The composer rules may specify:
- elements present at outputs of all remote re-multiplexers;
- elements present at outputs of a subset of remote re-multiplexers
- if elements with MPE-FEC and time slicing characteristics are inserted in real time or dispersed in a time interval;
- which elements define the time slicing boundaries; and
- if any PID needs to be re-mapped in order to preserve Continuity Counter (i.e., the 4-bit field incrementing with each transport stream packet with the same PID, for example, as defined in ISO 13818-1) integrity.

Format adaptation is performed on any single packet according to directives received from controller 213. The controller 213 can direct the adaptors 211, 212 to:
- store, count, and output packets identified as Burst Elements and requiring time dispersion at a lower packet rate such that all packets will be confined in the Time Slice Period to provide a stream of packets with a constant bit rate inside the Time Slice Period;
- change PID of packets requiring re-mapping;
- delete packets according to PID; and
- delete packets according to Table ID.

The controller 213 determines the Packet Type according to the composer rules. The controller passes the Packet Type information to MFP Composer 215 and drives the packet selector 214. An MFP packet may carry the Packet Type information for a limited number of packets; therefore, the slicer 216 splits the output of the packet selector 214 into blocks and for each block the MFP composer 215 creates an MFP packet. The interleaver 217 creates the complete stream by inserting one MFP packet before (or after) each block of packet computed by the slicer 216. A numerically controlled oscillator 218 locked to a stable source like a GPS receiver 121 generates all timing pulses for the system. The controller 213 uses both the time pulses created the output timing 212 and the time slice period from the analyzer 208, 209 to insert time slice start function in the MFP packets. The time slice start function is a function of MFP protocol described in further detail below.

The MFP is designed for a flexible definition of information about a block of TS packets transmitted in the TS before or after the MFP. Table 1 shows one example of the structure of MFP.

TABLE 1

| Syntax | N° of bits | Identifier | Remark |
|---|---|---|---|
| MFP( ){ | | | |
|   MPEG-2 TS Packet Header { | | | |
|     Sync byte | 8 | bslbf | 0x47 |
|     Transport error indicator | 1 | bslbf | 0 |
|     Payload unit start indicator | 1 | bslbf | 1 |
|     Transport priority | 1 | bslbf | 0 |
|     PID | 13 | uimsbf | 0x0007 |
|     Transport scrambling control | 2 | bslbf | 00 |
|     Adaptation field control | 2 | bslbf | 00 |
|     Continuity counter | 4 | uimsbf | |
|   } | | | |
|   MFP data( ){ | | | |
|     Version | 8 | uimsbf | 0x01 |
|     for (i=0;i<n;i++) { | | | |
|       Function( ) | | | |
|     } | | | |
|   } | | | |
| } | | | } |

The MFP packet is composed of MPEG-2 TS Packet Header (e.g., as defined by ISO/IEC 13818-1) and the MFP data as shown in Table 1.

The MPEG-2 TS Packet Header includes:
- Sync byte: fixed to 0x47
- Transport error indicator shall be set to 0
- Payload unit start indicator shall be set to 1.
- Transport priority shall be set to 0.
- PID the PID value for MFP is set to 0x0007.
- Transport scrambling control indicates this packet must be not scrambled and the value of this field shall be 00;
- Adaptation field control indicates no adaptation field shall be present in the MFP and the value of this field shall be 00;
- Continuity Counter is a 4 bit field increments every MFP packet.

Parameters and functions of the MFP data include: Version showing the version of MFP protocol and is set to 0x01; and Function: includes the functions of the MFP. The MFP functions are designed to insert different types of information about packets that follows/precedes the MFP in the TS. Table 2 shows one example of the defined functions and corresponding tags.

TABLE 2

| Function name | Tag | Description |
|---|---|---|
| Reserved | 0x00 | This tag is reserved and shall not be used |
| Packet type table | 0x01 | Map each packet of the frame to a specific channel for de-multiplexing purposes. |
| Clock recovery parameters | 0x02 | Transports information about the bit-rate setting of the TS. |
| PID re-mapping table | 0x03 | Transports information about a specific PID remapping. |
| PID filtering table | 0x04 | Transports information about a specific PID filtering. |
| Time-slice start | 0x05 | Flags the time-slice resynchronization point |
| Reserved for future use | 0x06 to 0xFF | These tags are reserved for future implementations of the protocol |

The Packet Type Table Function provides rules in order to decide if one packet will be part of the de-multiplexed Transport Stream. This function refers to the n packets that follow or precede the MFP. Table 3 describes an example of the structure and corresponding fields. The structure and fields have the following meaning:

Function tag: Tag of this function is set to 0x01.
Function length: the total length of this function. This value is variable.
Packet mode: defines meaning of following channel information and data sizes; values are according to Table 4.
Packet type: sets the destination of each of the following/preceding TS packets according to the Packet mode.

TABLE 3

| Syntax | N° of bits | Identifier | Remark |
|---|---|---|---|
| Packet Type Table Function( ){ | | | |
|   Function tag | 8 | uimsbf | 0x01 |
|   Function length | 8 | uimsbf | |
|   Packet mode | 8 | uimsbf | |
|   if Packet mode == 00 { | | | |
|     For (i=0;i<length*2;i++){ | | | |
|       Packet type | 4 | uimsbf | |
|     } | | | |
|   else if Packet mode == 01 { | | | |
|     For (i=0;i<length;i++){ | | | |
|       Packet type | 8 | uimsbf | |
|     } | | | |
|   else if Packet mode == 02 { | | | |
|     For (i=0;i<length*4;i++){ | | | |
|       Packet type | 2 | uimsbf | |
|     } | | | |
|   else if Packet mode == 03 { | | | |
|     For (i=0;i<length;i++){ | | | |
|       Packet type | 8 | uimsbf | |
|     } | | | |
| } | | | |

TABLE 4

| Packet mode | Tag | Size | Description |
|---|---|---|---|
| Reserved | 0x00 | — | This TAG is reserved and shall not be used. |
| 14 channels direct mapping | 0x01 | 4 bit | Marks the referred TS packed as one of the 14 channels or as one of the 2 fixed channels. 0x0: No channel, packet is discarded. 0x1 to 0xE: Packet is assigned to the relative channel number. 0xF: Packet is mapped to all channels. |
| 254 channels direct mapping | 0x02 | 8 bit | Marks the referred TS packet as one of the 254 channels or as one of the 2 fixed channels. 0x00: No channel, packet is discarded. 0x01 to 0xFE: Packet is assigned to the relative channel number 0xFF: Packet is mapped to all channels. |
| 2 channels AND mapping | 0x03 | 2 bit | Flags the mapping of the referred TS packet to each of the two channels. Bit 0: when 0 the packet is not de-multiplexed to channel 1, when 1 the packet is de-multiplexed to channel 1. Bit 1: when 0 the packet is not de-multiplexed to channel 2, when 1 the packet is de-multiplexed to channel 2. |
| 8 channels AND mapping | 0x04 | 8 bit | Flags the mapping of the referred TS packet to each of the 8 channels. Bit 0 to 7: when 0 the packet is not de-multiplexed to the relative channel, when 1 the packet is de-multiplexed to the relative channel. |
| 254 channels Store&Forward mapping | 0x05 | 8 bit | Marks the referred TS packet as one of the following channels: 0x00: No channel, packet is discarded. 0x01 to 0x3F: Store&Forward packets, buffered and inserted. 0x40: No channel. packet is discarded. 0x41 to 0x7F: Stream packets de-multiplexed in the relative channels. 0x80: No channel, packet is discarded. 0x81 to 0xBF: Packets to be replaced by Store&Forward packets. 0xC0: No channel, packet is discarded. 0xC1 to 0xFF: Global packets de-multiplexed by all channels. |

The clock recovery parameters function is the MFP function carrying information to compute the output transport stream clock parameters used by the re-multiplexer to synchronize output timing. The clock recovery parameters function sets the NCO increment and NCO overflow parameters for the byte-rate of the TS of a single channel. NCO is assumed to use a 27 MHz clock; therefore, the byte frequency is:

$$f = \frac{27 \cdot 10^8 \cdot NCO_{inc}}{NCO_{ovfl}}$$

Table 5 describes structure and fields of the clock recover function which have the following meaning:
Function tag: Tag of this function is set to 0x02 according to Table 2.
Function length: The total length of this function. This value is fixed to 0x0B.
Channel: sets the channel this function refers to.
NCO inc: sets the increment parameter of NCO.
NCO ovfl: sets the overflow parameter of NCO.

TABLE 5

| Syntax | N° of bits | Identifier | Remark |
|---|---|---|---|
| Clock Recovery Parameters Function ( ){ | | | |
| Function tag | 8 | uimsbf | 0x02 |
| Function length | 8 | uimsbf | 0x0B |
| Channel | 8 | uimsbf | |
| NCO inc | 32 | uimsbf | |
| NCO ovfl | 32 | uimsbf | |
| } | | | |

The PID re-mapping function sets a new PID value for any packet having a given PID value. Table 6 describes an example of the PID remapping function having the structure and fields having the following meaning:
Function tag: Tag of this function is set to 0x03 according to Table 2.
Function length: The total length of this function. This value is fixed to 0x07.
Channel: sets the channel this function refers to.
Original PID: sets the PID that has to be re-mapped.
Reserved: these three bits shall be set to 1.
Re-mapped PID: sets the PID that will replace original PID.

TABLE 6

| Syntax | N° of bits | Identifier | Remark |
|---|---|---|---|
| PID Re-mapping Function( ) { | | | |
| Function tag | 8 | uimsbf | 0x03 |
| Function length | 8 | uimsbf | 0x07 |
| Channel | 8 | uimsbf | |
| Reserved | 3 | fvb | 111 |
| Original PID | 13 | uimsbf | |
| Reserved | 3 | fvb | 111 |
| Re-mapped PID | 13 | uimsbf | |
| } | | | |

The PID filter function sets a PID value of packets to be dropped. Table 7 describes an example of the PID filter function structure and fields that have following meaning:
Function tag: tag of this function is set to 0x03 according to Table 2.
Function length: the total length of this function. This value is fixed to 0x04.
Channel: sets the channel this function refers to.
Status: this flag sets the status of filtering of the PID.
  0: the PID is dropped.
  1: the PID is passed.
Reserved: these two bits shall be set to 1.
Original PID: sets the PID that has to be filtered.

TABLE 7

| Syntax | N° of bits | Identifier | Remark |
|---|---|---|---|
| PID Filter Function( ) { | | | |
| Function tag | 8 | uimsbf | 0x04 |
| Function length | 8 | uimsbf | 0x05 |
| Channel | 8 | uimsbf | |
| Status | 1 | uimsbf | |
| Reserved | 2 | fvb | 11 |
| Original PID | 13 | uimsbf | |
| } | | | |

The time slice start function defines the start of a time slice period. Boundaries of a time slice period are 2 consecutive time slice starts. Table 8 describes an example of the time slice start function and the structure and fields that have the following meanings:
Function tag: tag of this function is set to 0x05 according to Table 2.
Function length: the total length of this function. This value is fixed to 0x03.
Status: this flag indicate the time slice is start.
  0: reserved.
  1: time slice start.
Reserved: these seven bits shall be set to 1.

TABLE 8

| Syntax | N° of bits | Identifier | Remark |
|---|---|---|---|
| Time Slice Function ( ){ | | | |
| Function tag | 8 | uimsbf | 0x05 |
| Function length | 8 | uimsbf | 0x03 |
| Status | 1 | bslbf | |
| Reserved | 7 | fvb | 1111111 |
| } | | | |

The detector 304 of the re-multiplexer identifies the PID of the MFP packets from the input transport stream and extracts the MFP packets and analyzes the MFP functions. The Packet Type Table Function carries one Packet Type field for each input packet. Packet Type field signals if the corresponding input packet is part of the output transport stream. According to the Packet Type, the input packets are written to memory 303 or they are dropped. The memory 303 is divided in several parts, such as a main buffer area and several delay buffer areas. Packets identified by the Packet Type as global packets or stream packets are stored in the main buffer area. Packets identified by the Packet Type as store and forward packets are stored in a delay buffer area. The Packet Type also indicates which delay buffer is used. Packets identified by the Packet Type as packets to be replaced by store and forward packets are replaced with packets read from delay buffer and are stored in main buffer area. The Packet Type also indicates which delay buffer is used. During the above-described processing, the re-mapped packets have their original PID restored. Packets identified as packets that are to be deleted are dropped.

Addresses for the input related memory operations are generated by input address generator 310. In one example, one write address counter is provided for the first memory area and write address counters also are provided for each delay buffer. The counters are incremented every time a packet is written in the corresponding area. There is one read address counter for each delay buffer and they are incremented every time a Packet Type code directs moving one packet from the delay buffer to the main buffer. The MFP time slice start function provided inside the MFP packet signals the start of the time slice period. The timing extractor 314 generates the block reset pulse 315. The read and write address counters are reset every time a block reset pulse 315 generated by the timing extractor 314.

The extractor 315 outputs transport stream clock parameters that are recovered from the clock recovery parameters function. Output transport stream clock parameters also may be derived by a standard MIP packet if present in the input transport stream. The output timing signals are computed by the NCO 335, and distributed to the output address generator 312. The output address generator 312 scans the main buffer with a linear address at the output clock rate. The output address generator is reset by the block reset pulse 315 delayed by a predetermined period to account for internal processing delays.

Accordingly, the system and processes described herein create a transport stream with maximum efficiency carrying several encapsulated contents, watermarks, and ancillary data such that remote re-multiplexers can re-multiplex the contents in several ways while keeping synchronous and deterministic operation. Synchronous deterministic operation allow each derived transport stream to be broadcasted in Single Frequency Networks, as all re-multiplexers have the same signal at the input and selecting the same content generates exactly the same stream (bit exact) in multiple locations.

It will be appreciated the main multiplexer 110 and re-multiplexers 130 may be implemented by a combination of hardwired logic, switches, gates, processing devices, buffers and/or software instructions provided from one or more memory devices interpreted by one or more processing devices. The processing devices may be implemented using any general-purpose or special purpose computing device, such as, for example, a processor, a digital signal processor, a microcomputer, a field programmable array, a programmable logic unit, a microprocessor or any other device capable of responding to and executing instructions in a defined manner. The processing device may run one or more software applications including the functions provided herein. The processing device also may access, store, manipulate, process, and create data in response to the applications. The software applications may include a computer program, a piece of code, an instruction, or some combination thereof, for independently or collectively instructing the processing device to operate as desired.

The applications, content, and data may be embodied permanently or temporarily in any type of machine, component, physical or virtual equipment, storage medium or device, or propagated signal wave capable of providing instructions or data to or being interpreted by the processing device. In particular, the applications or data may be stored by a storage medium or a memory including volatile and non-volatile memories that store digital data (e.g., a read only memory (ROM), a random access memory (RAM), a flash memory, a hard disk, a DROM, a flip-flop, a register, a buffer, an SRAM, DRAM, PROM, EPROM, OPTROM, EEPROM, NOVRAM, or RAMBUS), such that if the memory is read or accessed by the processing device, the specified steps, processes, and/or instructions are performed and/or data is accessed, processed, or stored. The memory may include an I/O interface, such that data and applications may be loaded and stored in the memory allowing the applications, programming, and data to be updated, deleted, changed, or augmented.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A method to feed transmitters operating in multiple single frequency network areas with diversified content through a single transport stream, the method comprising:
receiving multiple transport streams with content intended for the multiple single frequency network areas;
processing the received multiple transport streams to determine information about packets of each of the received transport streams;
selecting packets from the received multiple transport streams;
slicing the selected packets into a block of packets;
composing a metric feed packet (MFP) including information indicating whether packets in the block of packets are to be dropped at any one of multiple location re-multiplexers before being broadcasted to a particular single frequency network of the multiple single frequency network areas;
inserting the MFP before or after the block of packets; and
outputting the single transport stream including the block of packets and MFP to the location re-multiplexers of the multiple single frequency network areas.

2. The method of claim 1 wherein processing the received multiple input streams includes identifying information about at least two of the received multiple transports streams including packet type and content type.

3. The method of claim 1 wherein composing the MFP includes determining the destination of the selected packets.

4. The method of claim 1 wherein composing the MFP includes providing timing information for synchronous re-multiplexing of the input at a destination.

5. The method of claim 1 further comprising deriving an output time signal from an external reference to provide timing for the output transport stream.

6. The method of claim 1 wherein composing the MFP includes providing a map of each packet of the block of packets to a predetermined channel to de-multiplex the block of packets.

7. The method of claim 1 wherein composing the MFP includes providing clock recovery parameters including a bit-rate setting of the block of packets.

8. The method of claim 1 wherein composing the MFP includes providing a packet identifier remapping table for the block of packets.

9. The method of claim 1 wherein composing the MFP includes providing a packet identifier filtering table for the block of packets.

10. The method of claim 1 wherein composing the MFP includes providing a time slice start of the block of packets.

11. A multiplexer to feed transmitters operating in multiple single frequency network areas with diversified content through a single transport stream, the multiplexer comprising:
- a plurality of inputs for receiving multiple transport streams with content intended for the multiple single frequency network areas;
- an analyzer configured to process the received multiple transport streams to determine information about packets of each of the received transport streams;
- a controller configured to a generate control signal based on the determined information;
- a selector configured to select packets from the received multiple transport streams based on the control signal;
- a buffer configured to slice the selected packets into a block of packets;
- a metric feed packet (MFP) composer configured to generate a metric feed packet (MFP) including information indicating whether packets in the block of packets are to be dropped at any one of multiple location re-multiplexers before being broadcasted to a particular single frequency network of the multiple single frequency network areas based on the control signal;
- an interleaver configured to insert the MFP before or after the block of packets; and
- an output to transmit the single transport stream including the block of packets to the location re-multiplexers of the multiple single frequency network areas.

12. The system of claim 11 wherein the analyzer is configured to identify information about at least two of the received multiple transports streams including packet type and content type.

13. The system of claim 11 wherein the MFP composer determines the destination of the selected packets.

14. The system of claim 11 wherein the MFP includes timing information for synchronous re-multiplexing of the input at a destination.

15. The system of claim 11 further comprising an output timer to output a timing signal from an external reference to provide timing for the output transport stream.

16. The system of claim 11 wherein the MFP includes a map of each packet of the block of packets to a predetermined channel to de-multiplex the block of packets.

17. The system of claim 11 wherein the MFP includes clock recovery parameters including a bit-rate setting of the block of packets.

18. The system of claim 11 wherein the MFP includes a packet identifier remapping table for the block of packets.

19. The system of claim 11 wherein the MFP includes a packet identifier filtering table for the block of packets.

20. The system of claim 11 wherein the MFP includes an indication of a time slice start of the block of packets.

* * * * *